US012775564B2

(12) United States Patent
Kim et al.

(10) Patent No.: US 12,775,564 B2
(45) Date of Patent: Oct. 27, 2026

(54) SYSTEMS AND METHODS FOR TRANSMITTING AND RECEIVING DOUBLE DATA RATE (DDR) PHYSICAL (PHY) INTERFACE (DFI) SIGNALS USING UNIVERSAL CHIPLET INTERCONNECT EXPRESS (UCIe)

(71) Applicant: Samsung Electronics Co., Ltd., Suwon-si (KR)

(72) Inventors: Jonghyeon Kim, San Jose, CA (US); Chang Jun Kim, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/977,225

(22) Filed: Dec. 11, 2024

(65) Prior Publication Data

US 2025/0258786 A1 Aug. 14, 2025

Related U.S. Application Data

(60) Provisional application No. 63/672,134, filed on Jul. 16, 2024, provisional application No. 63/553,122, filed on Feb. 13, 2024.

(51) Int. Cl.
*G06F 13/16* (2006.01)
*G06F 13/38* (2006.01)

(52) U.S. Cl.
CPC ........ *G06F 13/1694* (2013.01); *G06F 13/382* (2013.01)

(58) Field of Classification Search
None
See application file for complete search history.

(56) References Cited

U.S. PATENT DOCUMENTS

| | | | | |
|---|---|---|---|---|
| 11,855,043 | B1 | 12/2023 | Farjadrad et al. | |
| 2019/0034367 | A1 * | 1/2019 | Kakaiya | G06F 13/20 |
| 2019/0089496 | A1 * | 3/2019 | Albertson | G06F 13/00 |
| 2022/0327083 | A1 | 10/2022 | Das Sharma et al. | |
| 2022/0342840 | A1 | 10/2022 | Das Sharma et al. | |
| 2022/0342841 | A1 * | 10/2022 | Choudhary | G06F 13/4291 |

(Continued)

FOREIGN PATENT DOCUMENTS

WO 2024092193 A1 5/2024

*Primary Examiner* — Jared I Rutz
*Assistant Examiner* — Elias Young Kim
(74) *Attorney, Agent, or Firm* — Womble Bond Dickinson (US) LLP

(57) ABSTRACT

Provided is a method for transmitting and receiving DFI signals using UCIe, the method including receiving, from a memory controller of a first die, a first DFI signal via a first controller-side DFI channel, the first controller-side DFI channel being one of at least two controller-side DFI channels including the first controller-side DFI channel and a second controller-side DFI channel, converting, by a controller-side UCIe circuit of the first die, at least a portion of the first DFI signal to a first UCIe transmit signal based on a mapping between the first controller-side DFI channel, the second controller-side DFI channel, and a first controller-side UCIe module, the first controller-side UCIe module including a UCIe controller and at least a portion of a UCIe physical layer, and transmitting, by the controller-side UCIe circuit, the first UCIe transmit signal to a second die including a memory.

19 Claims, 9 Drawing Sheets

(56) References Cited

U.S. PATENT DOCUMENTS

| | | | | |
|---|---|---|---|---|
| 2023/0236992 | A1* | 7/2023 | Bruce | G06F 13/16 710/306 |
| 2024/0007234 | A1* | 1/2024 | Harrington | H04L 69/22 |
| 2024/0036278 | A1 | 2/2024 | Toma et al. | |
| 2024/0095206 | A1 | 3/2024 | Dakshinamurthy et al. | |
| 2024/0298454 | A1* | 9/2024 | Haba | H01L 24/08 |
| 2024/0311330 | A1* | 9/2024 | Das Sharma | G06F 13/4265 |
| 2025/0077468 | A1* | 3/2025 | Jin | G06F 13/4004 |

* cited by examiner

FIG. 3

| | DFI Signal | Description | TX or RX? | Sig W |
|---|---|---|---|---|
| 1 | ROW | Row address and command | TX | 40 |
| 2 | COL | Column address and command | TX | 32 |
| 3 | WRDATA_EN | Write data enabled | TX | 8 |
| 4 | WRDATA | Data for writing to memory | TX | 512 |
| 5 | WRDATA_ECC | Error correction code for data WRDATA | TX | 32 |
| 6 | RDATA_EN | Data read enabled | TX | 8 |
| 7 | RDATA | Data copied from memory | RX | 512 |
| 8 | RDATA_ECC | Error correction code for data copied from memory | RX | 32 |
| 9 | RDATA_SEV | Severity of data error | RX | 32 |
| 10 | RDATA_VALID | Read data valid indicator | RX | 8 |
| 11 | DRAM_CLK_DIS | DRAM clock disabled | TX | 2 |
| 12 | CKE | DRAM clock enabled | TX | 2 |
| 13 | APAR | Address channel parity | TX | 4 |
| 14 | ALERT_AERR | Address channel parity error | RX | 2 |
| 15 | WCK_EN | Write clock enabled | TX | 8 |
| 16 | WCK_TOGGLE | Write clock toggle (write clock state) | TX | 16 |
| 17 | ALERT_DERR | Data channel parity error | RX | 4 |

| | | |
|---|---|---|
| TX (to mem.) | Transmit signal total (bits) | 664 |
| RX (from mem.) | Response signal total (bits) | 590 |

FIG. 4A

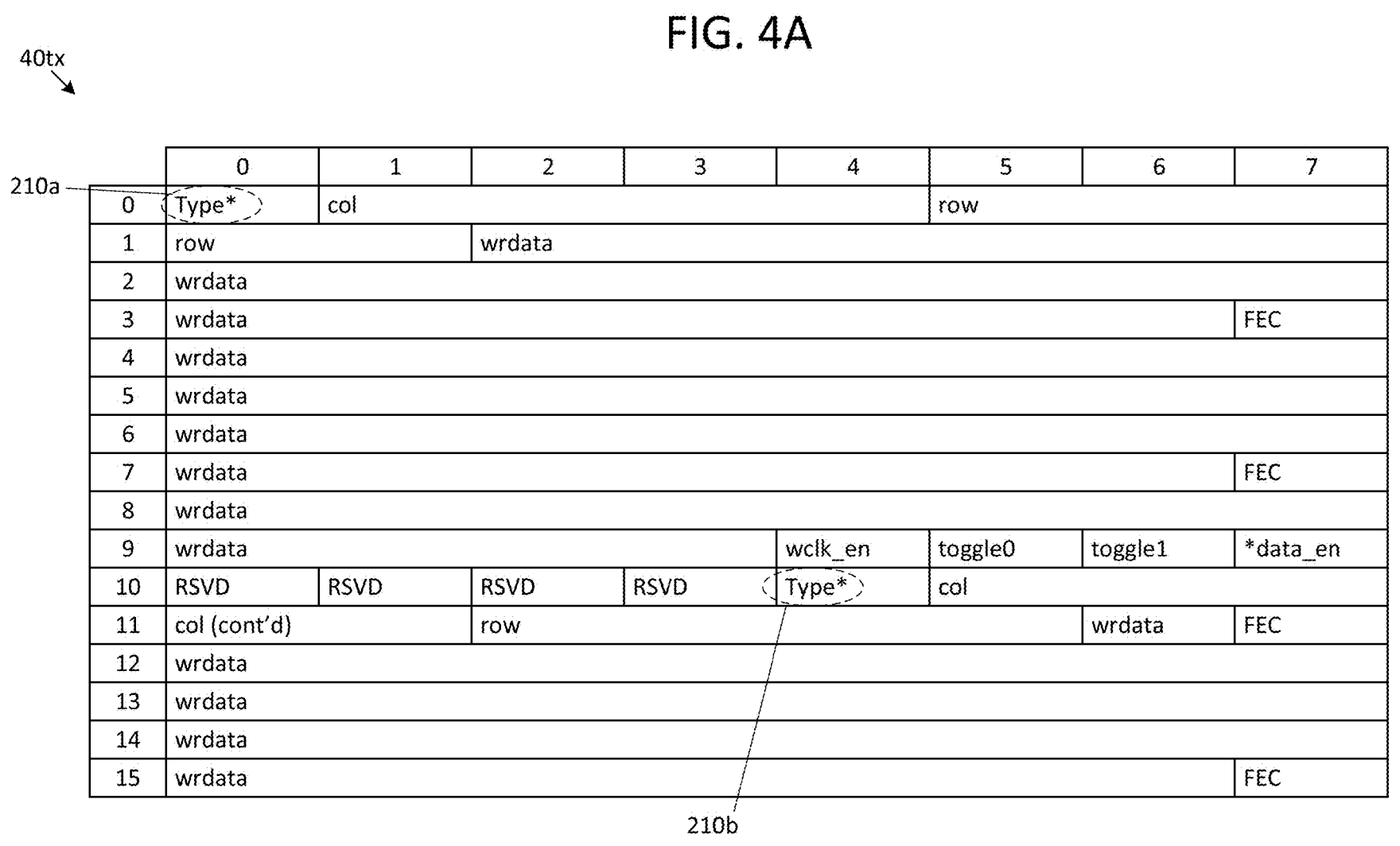

40tx

| | 0 | 1 | 2 | 3 | 4 | 5 | 6 | 7 |
|---|---|---|---|---|---|---|---|---|
| 0 | Type* (210a) | col | | | | row | | |
| 1 | row | | wrdata | | | | | |
| 2 | wrdata | | | | | | | |
| 3 | wrdata | | | | | | | FEC |
| 4 | wrdata | | | | | | | |
| 5 | wrdata | | | | | | | |
| 6 | wrdata | | | | | | | |
| 7 | wrdata | | | | | | | FEC |
| 8 | wrdata | | | | | | | |
| 9 | wrdata | | | | wclk_en | toggle0 | toggle1 | *data_en |
| 10 | RSVD | RSVD | RSVD | RSVD | Type* (210b) | col | | |
| 11 | col (cont'd) | | row | | | | wrdata | FEC |
| 12 | wrdata | | | | | | | |
| 13 | wrdata | | | | | | | |
| 14 | wrdata | | | | | | | |
| 15 | wrdata | | | | | | | FEC |

210a

210b

FIG. 4B

40tx

210c

| | 0 | 1 | 2 | 3 | 4 | 5 | 6 | 7 |
|---|---|---|---|---|---|---|---|---|
| 16 | wrdata | | | | | | | |
| 17 | wrdata | | | | | | | |
| 18 | wrdata | | | | | | | |
| 19 | wrdata | | | | | | | FEC |
| 20 | wrdata | wclk_en | toggle0 | toggle1 | *data_en | RSVD | RSVD | RSVD |
| 21 | RSVD | Type* | Timestamp | col | | | | row |
| 22 | row | | | | wrdata | | | |
| 23 | wrdata | | | | | | | FEC |
| 24 | wrdata | | | | | | | |
| 25 | wrdata | | | | | | | |
| 26 | wrdata | | | | | | | |
| 27 | wrdata | | | | | | | FEC |
| 28 | wrdata | | | | | | | |
| 29 | wrdata | | | | | | | |
| 30 | wrdata | | | | | | wclk_en | toggle0 |
| 31 | toggle1 | *data_en | RSVD | RSVD | RSVD | RSVD | RSVD | FEC |

50rx

FIG. 5A

| | 0 | 1 | 2 | 3 | 4 | 5 | 6 | 7 |
|---|---|---|---|---|---|---|---|---|
| 0 | Timestamp | valid | RSVD | RSVD | RSVD | RSVD | RSVD | RSVD |
| 1 | rdata | | | | | | | |
| 2 | rdata | | | | | | | |
| 3 | rdata | | | | | | | FEC |
| 4 | rdata | | | | | | | |
| 5 | rdata | | | | | | | |
| 6 | rdata | | | | | | | |
| 7 | rdata | | | | | | | FEC |
| 8 | rdata | | | | | | | |
| 9 | rdata | | sev0 | sev0 | sev1 | sev1 | aerr[3:0] | derr[3:0] |
| 10 | Timestamp | valid | RSVD | RSVD | RSVD | RSVD | RSVD | RSVD |
| 11 | rdata | | | | | | | FEC |
| 12 | rdata | | | | | | | |
| 13 | rdata | | | | | | | |
| 14 | rdata | | | | | | | |
| 15 | rdata | | | | | | | FEC |

410a

410b

FIG. 5B

50rx

| | 0 | 1 | 2 | 3 | 4 | 5 | 6 | 7 |
|---|---|---|---|---|---|---|---|---|
| 16 | rdata | | | | | | | |
| 17 | rdata | | | | | | | |
| 18 | rdata | | | | | | | |
| 19 | rdata | | sev0 | sev0 | sev1 | sev1 | aerr[3:0] | FEC |
| 20 | derr[3:0] | RSVD | RSVD | RSVD | RSVD | RSVD | RSVD | RSVD |
| 21 | Timestamp | valid | RSVD | RSVD | RSVD | RSVD | RSVD | RSVD |
| 22 | rdata | | | | | | | |
| 23 | rdata | | | | | | | FEC |
| 24 | rdata | | | | | | | |
| 25 | rdata | | | | | | | |
| 26 | rdata | | | | | | | |
| 27 | rdata | | | | | | | FEC |
| 28 | rdata | | | | | | | |
| 29 | rdata | | | | | | | |
| 30 | rdata | | sev0 | sev0 | sev1 | sev1 | aerr[3:0] | derr[3:0] |
| 31 | RSVD | RSVD | RSVD | RSVD | RSVD | RSVD | RSVD | FEC |

410c

SYSTEMS AND METHODS FOR TRANSMITTING AND RECEIVING DOUBLE DATA RATE (DDR) PHYSICAL (PHY) INTERFACE (DFI) SIGNALS USING UNIVERSAL CHIPLET INTERCONNECT EXPRESS (UCIe)

CROSS-REFERENCE TO RELATED APPLICATION(S)

This application claims priority to, and benefit of, U.S. Provisional Application Ser. No. 63/672,134, filed on Jul. 16, 2024, and entitled "METHOD FOR TRANSMIT AND RECEIVE DFI SIGNALS USING UCIE," and U.S. Provisional Application Ser. No. 63/553,122, filed on Feb. 13, 2024, and entitled "DFI TO UCIe MAPPING," the entire contents of both of which are incorporated herein by reference.

FIELD

Aspects of some embodiments of the present disclosure relate to systems and methods for transferring signals to and from memory.

BACKGROUND

In the field of computers, a computing system may include a host and one or more memory devices connected to (e.g., communicatively coupled to) the host. Such computing systems have become increasingly popular, in part, for allowing many different users to share the computing resources of the system. Memory requirements have increased over time as the number of users of such systems and the number and complexity of applications running on such systems have increased.

The present background section is intended to provide context only, and the disclosure of any embodiment or concept in this section does not constitute an admission that said embodiment or concept is prior art.

SUMMARY

Aspects of some embodiments of the present disclosure are directed to memory systems with improved transmitting and reception of double data rate (DDR) physical layer (PHY) interface (DFI) signals using universal chiplet interconnect express (UCIe).

According to some embodiments of the present disclosure, there is provided a method for transmitting and receiving DDR PHY Interface (DFI) signals using universal chiplet interconnect express (UCIe), the method including receiving, from a memory controller of a first die, a first DFI signal via a first controller-side DFI channel, the first controller-side DFI channel being one of at least two controller-side DFI channels including the first controller-side DFI channel and a second controller-side DFI channel, converting, by a controller-side UCIe circuit of the first die, at least a portion of the first DFI signal to a first UCIe transmit signal based on a mapping between the first controller-side DFI channel, the second controller-side DFI channel, and a first controller-side UCIe module, the first controller-side UCIe module including a UCIe controller and at least a portion of a UCIe physical layer, and transmitting, by the controller-side UCIe circuit, the first UCIe transmit signal to a second die including a memory.

The mapping may be based on a bandwidth of the first controller-side DFI channel, a bandwidth of the second controller-side DFI channel, and a bandwidth of the first controller-side UCIe module.

The first DFI signal may include a total number of signals that is equal to a first number of signals, and the portion of the first DFI signal may include a total number of signals that is equal to a second number of signals, the second number of signals being less than the first number of signals.

The second number of signals may be based on the first DFI signal including a write command, and the first UCIe transmit signal may include a first flow control unit (flit) format including a first field associated with the first controller-side DFI channel and a second field associated with the second controller-side DFI channel.

The at least two controller-side DFI channels may further include a third controller-side DFI channel, the first controller-side UCIe module may be one of one or more controller-side UCIe modules of the controller-side UCIe circuit, and the mapping may be based on providing a ratio of three controller-side DFI channels to a number of controller-side UCIe modules including the first controller-side UCIe module.

The number of controller-side UCIe modules may be one, and the ratio may be three to one.

The number of controller-side UCIe modules may be two, and the ratio may be three to two.

The method may further include receiving, from a memory controller of the second die, a second DFI signal via a first memory-side DFI channel, the first memory-side DFI channel being one of at least two memory-side DFI channels including the first memory-side DFI channel and a second memory-side DFI channel, converting, by a memory-side UCIe circuit of the first die, at least a portion of the second DFI signal to a first UCIe response signal based on a mapping between the first memory-side DFI channel, the second memory-side DFI channel, and a first memory-side UCIe module, the first memory-side UCIe module including a UCIe controller and at least a portion of a UCIe physical layer, and transmitting, by the memory-side UCIe circuit, the first UCIe response signal to the first die.

The second DFI signal may include a total number of signals that is equal to a first number of signals, and the portion of the second DFI signal may include a total number of signals that is equal to a second number of signals, the second number of signals being less than the first number of signals.

The second number of signals may be based on the second DFI signal including a read command, and the first UCIe response signal may include a second flow control unit (flit) format including a first field associated with the first memory-side DFI channel and a second field associated with the second memory-side DFI channel.

According to some other embodiments of the present disclosure, there is provided a system including a memory controller, a number of controller-side DFI channels communicatively connected to the memory controller, and a memory-side UCIe circuit including a number controller-side UCIe modules communicatively connected to the controller-side DFI channels, the number of controller-side UCIe modules being less than the number of controller-side DFI channels.

A ratio of the number of controller-side DFI channels to the number of controller-side UCIe modules may be equal to three to one.

A ratio of the number of controller-side DFI channels to the number of controller-side UCIe modules may be equal to three to two.

The system may further include a memory, a number of memory-side DFI channels communicatively connected to the memory, and a number of memory-side UCIe modules communicatively connected to the memory-side DFI channels, the number of memory-side UCIe modules being less than the number of memory-side DFI channels.

A ratio of the number of memory-side DFI channels to the number of memory-side UCIe modules may be equal to three to one.

A ratio of the number of memory-side DFI channels to the number of memory-side UCIe modules may be equal to three to two.

The memory-side UCIe circuit may be configured to convert at least a portion of a first DFI signal to a first UCIe transmit signal based on mapping the controller-side DFI channels to the controller-side UCIe modules.

The first DFI signal may include a total number of signals that is equal to a first number of signals, and the portion of the first DFI signal may include a total number of signals that is equal to a second number of signals, the second number of signals being less than the first number of signals.

The second number of signals may be based on the first DFI signal including a write command, and the first UCIe transmit signal may include a first flow control unit (flit) format including a first field associated with a first controller-side DFI channel of the controller-side DFI channels and a second field associated with a second controller-side DFI channel of the controller-side DFI channels.

According to some other embodiments of the present disclosure, there is provided a system including a host to generate a command, a memory controller to receive the command, a controller-side UCIe circuit communicatively connected to the memory controller via at least two controller-side DFI channels, and a memory communicatively coupled to the memory controller through the controller-side UCIe circuit, wherein the command causes the controller-side UCIe circuit to perform converting at least a portion of a first DFI signal from the at least two controller-side DFI channels to a first UCIe transmit signal based on a mapping between the at least two DFI channels and a first controller-side UCIe module associated with the controller-side UCIe circuit, the first controller-side UCIe module including a UCIe controller and at least a portion of a UCIe physical layer.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 3 is a table listing DFI signals for mapping to a UCIe protocol, according to some embodiments of the present disclosure.

FIG. 4A and FIG. 4B (collectively, FIG. 4) are tables depicting a UCIe flow control unit (flit) format for a transmit signal packet 40*tx* for a write operation (e.g., for a writing operation), according to some embodiments of the present disclosure.

FIG. 5A and FIG. 5B (collectively, FIG. 5) are tables depicting a UCIe flit format for a response signal packet 50*rx* for a read operation (e.g., for a reading operation), according to some embodiments of the present disclosure.

Figure 1:
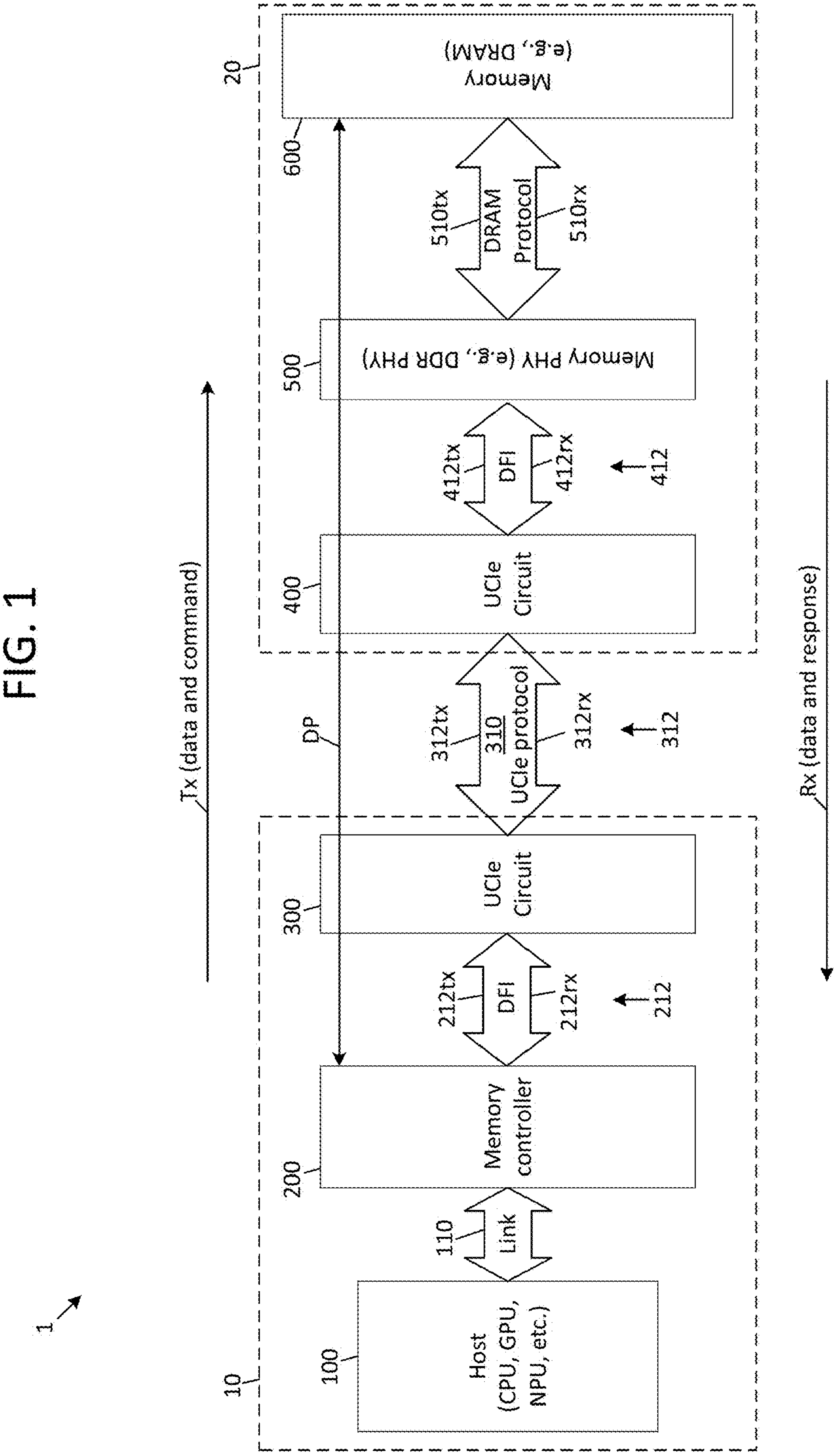
FIG. 1 is a block diagram depicting a data path of a system for transmitting and receiving DFI signals using UCIe, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items. For example, the expression "A and/or B" denotes A, B, or A and B.

For the purposes of this disclosure, expressions such as "at least one of," when preceding a list of elements, modify the entire list of elements and do not modify the individual elements of the list. For example, "at least one of X, Y, or Z," "at least one of X, Y, and Z," and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Any of the functionalities described herein, including any of the functionalities that may be implemented with a host, a device, and/or the like or a combination thereof, may be implemented with hardware, software, firmware, or any combination thereof including, for example, hardware and/or software combinational logic, sequential logic, timers, counters, registers, state machines, volatile memories such as dynamic RAM (DRAM) and/or static RAM (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application-specific ICs (ASICs), central processing units (CPUs) including complex instruction set computer (CISC) processors and/or reduced instruction set computer (RISC) processors, graphics processing units (GPUs), neural processing units (NPUs), tensor processing units (TPUs), data processing units (DPUs), and/or the like, executing instructions stored in any type of memory. In some embodiments, one or more components may be implemented as a system-on-a-chip (SoC).

Any of the computational devices disclosed herein may be implemented in any form factor, such as 3.5 inch, 2.5 inch, 1.8 inch, M.2, Enterprise and Data Center Standard Form Factor (EDSFF), NF1, and/or the like, using any connector configuration such as Serial Advanced Technology Attachment (SATA), Small Computer System Interface (SCSI), Serial Attached SCSI (SAS), U.2, and/or the like. Any of the computational devices disclosed herein may be implemented entirely or partially with, and/or used in connection with, a server chassis, server rack, data room, data center, edge data center, mobile edge data center, and/or any combinations thereof.

Any of the devices disclosed herein that may be implemented as storage devices may be implemented with any type of nonvolatile storage media based on solid-state media, magnetic media, optical media, and/or the like. For example, in some embodiments, a storage device (e.g., a computational storage device) may be implemented as an SSD based on not-AND (NAND) flash memory, persistent memory such as cross-gridded nonvolatile memory, memory with bulk resistance change, PCM, and/or the like, or any combination thereof.

Any of the communication connections and/or communication interfaces disclosed herein may be implemented with one or more interconnects, one or more networks, a network of networks (e.g., the Internet), and/or the like, or a combination thereof, using any type of interface and/or protocol. Examples include Peripheral Component Interconnect Express (PCIe), non-volatile memory express (NVMe), NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, SATA, SCSI, SAS, Internet Wide Area RDMA Protocol (iWARP), and/or a coherent protocol, such as Compute Express Link (CXL), CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced extensible Interface (AXI), any generation of wireless network including 2G, 3G, 4G, 5G, 6G, and/or the like, any generation of Wi-Fi, Bluetooth, near-field communication (NFC), and/or the like, or any combination thereof.

In some embodiments, a software stack may include a communication layer that may implement one or more communication interfaces, protocols, and/or the like such as PCIe, NVMe, CXL, Ethernet, NVMe-oF, TCP/IP, and/or the like, to enable a host and/or an application running on the host to communicate with a computational device or a storage device.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computers, a computing system may include a host and one or more memory devices connected to (e.g., communicatively connected to) the host. The memory devices may include volatile memory. The volatile memory, which may include DRAM, is frequently used in artificial-intelligence (AI) applications. Such volatile memories may be included in high bandwidth memory (HBM). However, some physical layers of HBM (HBM PHY) may consume significant amounts of power. Additionally, some DRAM PHY technologies may present challenges for connecting multiple memories.

Aspects of some embodiments of the present disclosure provide a die-to-die interface for connecting HBM, which may improve efficiency and may improve scalability of volatile memories such as DRAM used in HBM and/or the like.

In some embodiments, a DRAM interface may be provided based on transmitting DFI signals through a UCIe interface (e.g., a die-to-die UCIe interface), such that power consumption may be reduced and/or scalability for connecting multiple memories may be improved.

In some memory systems, a memory controller may drive DFI signals to access a memory (e.g., a DRAM). The DFI specification defines an interface protocol between memory controller logic and PHY interfaces. One of the goals of DFI is to reduce integration costs while enabling performance and data throughput efficiency. In some embodiments, a DDR PHY may convert DFI signals to Joint Electron Device Engineering Council (JEDEC) standard signals to communicate to a memory (e.g., to communicate with DRAM). In some memory systems, a memory controller may send DFI signals to (e.g., directly to) a DDR PHY without an intervening change in protocols. In some embodiments, the DDR PHY may convert DFI signals to a memory core die protocol. For example, a JEDEC protocol conversion may not be suitable, and the DDR PHY may provide a direct conversion from DFI to the memory core die protocol. In some embodiments, the DDR PHY may communicate with the memory (e.g., with the DRAM) using a memory protocol (e.g., a DRAM protocol).

In some memory systems, a DDR PHY may convert a DFI signal to a JEDEC standard signal. Contrastingly, in some embodiments of the present disclosure, the memory system may include a DDR PHY in the memory side that is a DRAM PHY (e.g., a 3-dimensional (3D) DRAM PHY), which converts a DFI signal to a through silicon via (TSV) signal connected to a HBM memory. In such embodiments, the DDR PHY (e.g., the 3D DRAM PHY) may not convert DFI signals to JEDEC signals.

AI model size (e.g., large language model (LLM) size), is growing dramatically. More memory and more computation may be suitable as model sizes increase. Power consumption is also increasing and may affect total system cost (e.g., in terms of power consumption costs, cooling system costs, and/or the like). To have more computation power, it may be suitable to have more memory. Total memory size may be more easily expanded by using UCIe, than with other approaches (e.g., than with other interconnect technologies), because UCIe may be easy to integrate.

For some AI applications, power consumption and scalability may be relevant performance factors. For example, machine-learning models having increasingly large memories may benefit from improved efficiency and scalability using UCIe. AI model sizes, (e.g., LLM sizes), are growing dramatically. More memory and more computation may be utilized as an AI model size increases. Power consumption is also increasing along with the increased model sizes. Power consumption may affect a total system cost (e.g., power consumption cost, cooling system cost, and the like). To have more computation power, more memory is needed. It may be easy to expand a total memory size by using UCIe based on UCIe being relatively easy to integrate. Accordingly, aspects of some embodiments of the present disclosure may provide for more efficient methods of communicating with memory (e.g., DRAM) than with some DDR PHY methods.

In some embodiments, a memory system may use a UCIe (die-to-die) interface (instead of a DDR PHY interface of some conventional memory systems) to transmit DFI signals, which may reduce power consumption and may increase the scalability to connect multiple memories.

FIG. 1 is a block diagram depicting a data path DP of a system 1 for transmitting and receiving DFI signals using UCIe, according to some embodiments of the present disclosure.

Referring to FIG. 1, in some embodiments, the data path DP may include a path for passing transmit signals Tx (also referred to as transmission signals) and response signals Rx (also referred to as reception signals or received signals) between a memory controller 200 and a memory 600 (e.g., a memory device including memory, such as DRAM). The memory controller 200 may send transmit signals Tx to the memory 600 and may receive response signals Rx from the memory 600. A given transmit signal Tx may include a command and may include data. For example, a given transmit signal Tx that includes a write command may also include the data to be written to the memory 600. A given transmit signal Tx that includes a read command may include the read command without also including data to be written to the memory 600. Likewise, a given response signal Rx may include a response and may include data. For example, a given response signal Rx associated with a read command may include the data that is read from (e.g., copied from) the memory 600.

In some embodiments, the system 1 may include a first die 10 (e.g., a first semiconductor die or chip or chiplet) and a second die 20 (a second semiconductor die or chip or chiplet). The system 1 may include a die-to-die interface 310 using UCIe modules to send DFI signals (e.g., to send signals generated based on converting DFI signals) from the memory controller 200 to the memory 600 and from the memory 600 to the memory controller 200, instead of using DDR PHY. For example, a controller-side UCIe circuit 300 (e.g., a memory-controller-side UCIe circuit) and a memory-side UCIe circuit 400 may each include one or more UCIe modules to transfer controller-side DFI signals 212 (e.g., memory-controller-side DFI signals) and memory-side DFI signals 412 between the memory controller 200 and the memory 600. As discussed in further detail below, the controller-side UCIe circuit 300 and the memory-side UCIe circuit 400 may each include one or more UCIe modules. For example, the controller-side UCIe circuit 300 may include one or more controller-side UCIe modules 304 (see FIGS. 2A and 2B), and the memory-side UCIe circuit 400 may include one or more memory-side UCIe modules 404 (see FIGS. 2A and 2B). Each of the UCIe modules (e.g., the controller-side UCIe modules 304 and/or the memory-side UCIe modules 404) may include a UCIe controller and a UCIe physical layer (PHY) (e.g., at least a portion of a UCIe PHY) for mapping between DFI signals (e.g., controller-side DFI signals 212 or memory-side DFI signals 412) and UCIe signals 312. By using the die-to-die interface 310, power consumption by the system 1 may be reduced and/or scalability for connecting multiple memories 600 may be increased.

For example, traditional (e.g., conventional) DRAM PHY may consume more power compared to UCIe. Traditional DRAM PHY may consume more power compared to UCIe. Also, instead of using traditional PHY, in some embodiments of the present disclosure the memory system 1 may include a 3D DRAM PHY, which may convert DFI signals to DRAM TSV signals. The 3D DRAM PHY may consume less power compared with some traditional DRAM PHYs. Thus, aspects of some embodiments of the present disclosure may save total power by using UCIe and/or 3D DRAM PHY (e.g., by using a combination of UCIe and 3D DRAM PHY).

Aspects of some embodiments of the present disclosure may allow for scalability to be improved (e.g., increased). For example, as power consumption and size are reduced, total memory may be expanded by using multiple memories with UCIe.

In some embodiments, the system 1 may include a host 100 (e.g., a master controller, such as a CPU, GPU, NPU, and/or the like) connected to the memory controller 200 via a link 110 (e.g., a data link, such as a system bus and/or the like). The host 100 may generate commands for performing memory operations. A memory operation may include read and/or write operations.

For example, the system 1 may perform a read or write operation based one or more of the following operations. The host 100 may issue a command (e.g., a read or a write command) to the memory controller 200. The memory controller 200 may receive the command via the link 110 and may issue the command in accordance with a DFI protocol as a controller-side DFI transmit signal 212*tx*. The controller-side UCIe circuit 300 may map (e.g., may convert) the controller-side DFI transmit signal 212*tx* to the UCIe protocol and may send the command to the memory-side UCIe circuit 400 via the die-to-die interface 310 as a UCIe transmit signal 312*tx*. The memory-side UCIe circuit 400 may convert the command from the UCIe protocol to the DFI protocol as a memory-side DFI transmit signal 412*tx*. The memory-side DFI transmit signal 412*tx* may be received by a memory physical layer 500 (e.g., a DDR PHY), which may provide the command to the memory 600 via a memory transmit signal 510*tx* in compliance with a memory protocol (e.g., via a DRAM protocol). The memory 600 may perform the operation (e.g., the read operation or the write operation) based on the command.

In the case of a read operation, the memory 600 may read data from the memory 600 and may provide the data to the memory physical layer 500 via a memory response signal 510*rx* in accordance with the memory protocol. The memory physical layer 500 may transfer the data to the memory-side UCIe circuit 400 via a memory-side DFI response signal 412*rx* in compliance with the DFI protocol. The memory-side UCIe circuit 400 may map (e.g., may convert) the memory-side DFI response signal 412*rx* to the UCIe protocol and may send the data to the controller-side UCIe circuit 300 via the die-to-die interface 310 as a UCIe response signal 312*rx*. The controller-side UCIe circuit 300 may convert the UCIe response signal 312*rx* to the DFI protocol and may send the data to the memory controller 200 via a controller-side DFI response signal 212*rx*. The memory controller 200 may send the data to the host 100 via the link 110.

In the case of a write operation, the memory 600 may write data to the memory 600 based on the command. For example, the command may be accompanied by data for writing to the memory 600.

Figure 2A:
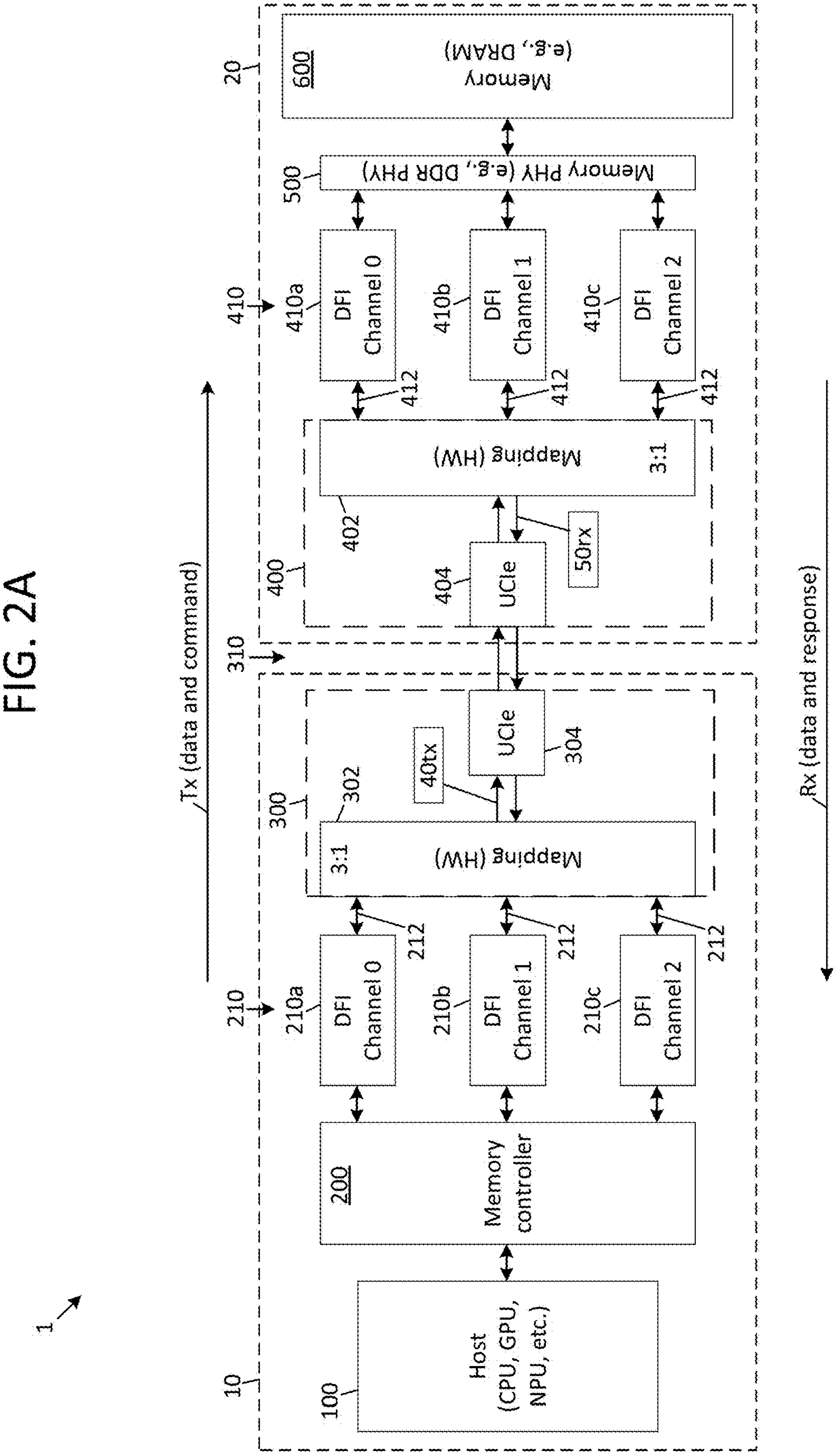
FIG. 2A is a block diagram depicting a three-to-one mapping configuration, according to some embodiments of the present disclosure.

FIG. 2A is a block diagram depicting a three-to-one mapping configuration, according to some embodiments of the present disclosure.

Figure 2B:
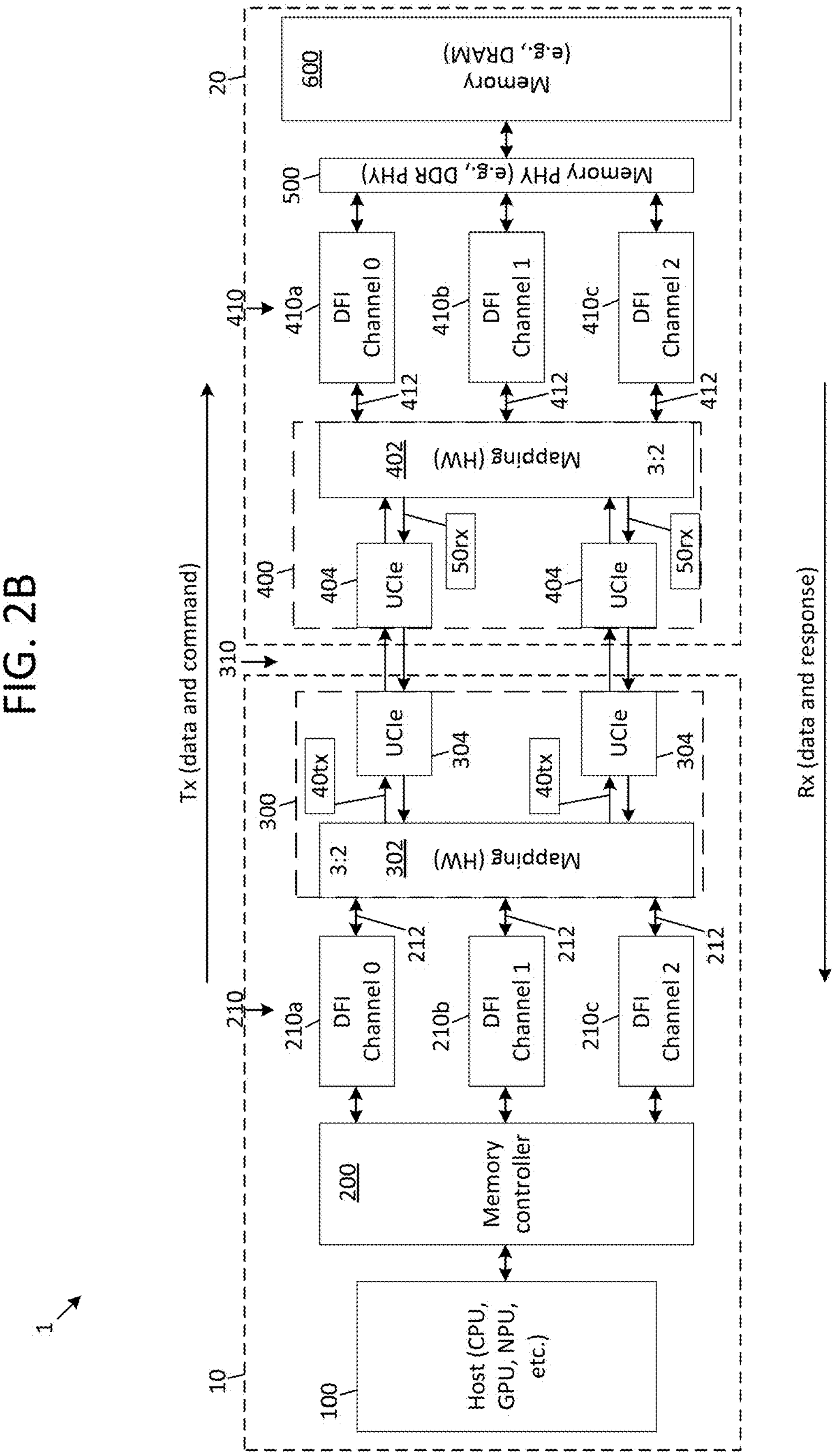
FIG. 2B is a block diagram depicting a three-to-two mapping configuration, according to some embodiments of the present disclosure.

FIG. 2B is a block diagram depicting a three-to-two mapping configuration, according to some embodiments of the present disclosure.

Referring to FIG. 2A, in some embodiments, the DFI signals 212 and/or 412 (e.g., 212*tx*, 212*rx*, 412*tx*, and 412*rx*) may be transferred between the memory controller 200 and the memory 600 via a plurality of DFI channels (e.g., controller-side DFI channels 210 and memory-side DFI channels 410). A bandwidth of the DFI channels and a bandwidth of UCIe modules (e.g., controller-side UCIe-modules 304 and memory-side UCIe modules 404) may be different. To use the full bandwidth of a given UCIe module (e.g., a given controller-side UCIe module 304 or a given memory-side UCIe module 404), the controller-side DFI channels 210 and/or the memory-side DFI channels 410 may be respectively assigned to the controller-side UCIe-modules 304 and/or the memory-side UCIe modules 404 in a first basic configuration of three-to-one (3:1) or in a second basic configuration of three-to-two (3:2) (see FIG. 2B).

Referring still to FIG. 2A, a bandwidth (e.g., a maximum bandwidth) of the three controller-side DFI channels 210*a*, 210*b*, and 210*c* may be equal to about 32 gigabits per second (Gbps). In some embodiments of the present disclosure, the three controller-side DFI channels 210*a*, 210*b*, and 210*c* may be mapped to one controller-side UCIe module 304 having a bandwidth (e.g., a maximum bandwidth) of 32 Gbps, according to the 3:1 configuration. Likewise, a bandwidth (e.g., a maximum bandwidth) of the three memory-side DFI channels 410*a*, 410*b*, and 410*c* may be equal to about 32 Gbps. In some embodiments of the present disclosure, the three memory-side DFI channels 410*a*, 410*b*, and 410*c* may be mapped to one memory-side UCIe module 404 having a bandwidth (e.g., a maximum bandwidth) of 32 Gbps, according to the 3:1 configuration.

In some embodiments, a controller-side mapping 302 for mapping the three controller-side DFI channels 210*a*, 210*b*, and 210*c* to the one controller-side UCIe module 304 may be implemented using mapping hardware (HW) (e.g., a physical layer) and by sending a transmit signal packet 40*tx* (e.g., a TX UCIe packet) using a UCIe TX flit format, which is discussed in further detail below with reference to FIGS. 4A and 4B.

In some embodiments, a memory-side mapping 402 for mapping the three memory-side DFI channels 410*a*, 410*b*, and 410*c* to the one memory-side UCIe module 404 may be implemented using mapping hardware (e.g., a physical layer) and by sending a response signal packet 50*rx* (e.g., a RX UCIe packet) using a UCIe RX flit format, which is discussed in further detail below with reference to FIGS. 5A and 5B.

The 3:1 configuration may be scaled by a factor of N, wherein N is any integer greater than zero. For example, 3N controller-side DFI channels 210 may be mapped to 1N controller-side UCIe modules 304 (e.g., 12 controller-side DFI channels 210 may be mapped to 4 controller-side UCIe modules 304). Likewise, 3N memory-side DFI channels 410 may be mapped to 1N memory-side UCIe modules 404 (e.g., 12 memory-side DFI channels 410 may be mapped to 4 memory-side UCIe modules 404).

Referring to FIG. 2B, and as similarly discussed above, the bandwidth (e.g., a maximum bandwidth) of the three controller-side DFI channels 210*a*, 210*b*, and 210*c* may be equal to about 32 Gbps. In some embodiments of the present disclosure, the three controller-side DFI channels 210*a*, 210*b*, and 210*c* may be mapped to two controller-side UCIe modules 304 having a bandwidth (e.g., a maximum bandwidth) of 16 Gbps each, according to the 3:2 configuration. Likewise, and as similarly discussed above, the bandwidth (e.g., a maximum bandwidth) of the three memory-side DFI channels 410*a*, 410*b*, and 410*c* may be equal to about 32 Gbps. In some embodiments of the present disclosure, the three memory-side DFI channels 410*a*, 410*b*, and 410*c* may be mapped to two memory-side UCIe modules 404 having a bandwidth (e.g., a maximum bandwidth) of 16 Gbps each, according to the 3:2 configuration.

The 3:2 configuration may be scaled by a factor of N, wherein N is any integer greater than zero. For example, 3N controller-side DFI channels 210 may be mapped to 2N controller-side UCIe modules 304 (e.g., 12 controller-side DFI channels 210 may be mapped to 8 controller-side UCIe modules 304). Likewise, 3N memory-side DFI channels 410 may be mapped to 2N memory-side UCIe modules 404 (e.g., 12 memory-side DFI channels 410 may be mapped to 8 memory-side UCIe modules 404).

FIG. 3 is a table listing DFI signals for mapping to the UCIe protocol, according to some embodiments of the present disclosure.

Referring to FIG. 3, converting all the DFI signals (which may include more than 40 different signals) to the UCIe protocol for transferring, in a given transmit signal packet 40*tx* or in a given response signal packet 50*rx*, through the UCIe protocol may not be practical because the bandwidth of the UCIe modules (e.g., the controller-side UCIe modules 304 and the memory-side UCIe modules 404) may be limited. The DFI signals listed in FIG. 3 may be sufficient for high-bandwidth memory (HBM) operation (e.g., may be sufficient for HBM3 operation). In some embodiments, a given DFI signal (e.g., a given controller-side DFI transmit signal 212*tx* and/or a given memory-side DFI response signal 412*rx* (see FIG. 1)) may include a total number of signals that is equal to a first number of signals, including the 11 transmit Tx signals or the 6 response signals Rx, listed in FIG. 3, in addition to other DFI signals, which are not listed in FIG. 3 but are known to one of skill in the art. In some embodiments, only a portion of the given DFI signal may be converted to a corresponding UCIe signal 312 (e.g., a given UCIe transmit signal 312*tx* or a given UCIe response signal 312*rx*) and transferred via the die-to-die interface 310. For example, the portion of the given DFI signal (e.g., the given controller-side DFI transmit signal 212*tx* and/or the given memory-side DFI response signal 412*rx*) that is converted to the corresponding UCIe signal 312 may include a total number of signals that is equal to a second number of signals that is less than the first number of signals. For example, the corresponding UCIe signal may include the 11 transmit Tx signals or the 6 response signals Rx listed in FIG. 3 with fewer than all (e.g., with none) of the additional other DFI signals (which are not listed in FIG. 3 but are known to one of skill in the art).

For example, to reduce (e.g., to minimize) a number of UCIe modules (e.g., the controller-side UCIe modules 304 and the memory-side UCIe modules 404) and to improve performance, the DFI signals to be converted to UCIe and transferred via the die-to-die interface 310 may include (e.g., may be limited to or may be selected from) the following DFI signals: (1) ROW refers to a row address and command, which is a transmit signal Tx that may have a signal width of about 40 bits; (2) COL refers to a column address and command, which is a transmit signal Tx that may have a signal width of about 32 bits; (3) WRDATA_EN refers to a write data enabled, which is a transmit signal Tx that may have a signal width of about 8 bits; (4) WRDATA refers to data for writing to memory, which is a transmit signal Tx that may have a signal width of about 512 bits; (5) WRDATA_ECC refers to error correction code for WRDATA, which is a transmit signal Tx that may have a signal width of about 32 bits; (6) RDATA_EN refers to a data read enabled, which is a transmit signal Tx that may have a signal width of about 8 bits; (7) RDATA refers to data copied from memory, which is a response signal Rx that may have a signal width of about 512 bits; (8) RDATA_ECC refers to error correction code for RDATA, which is a response signal Rx that may have a signal width of about 32 bits; (9) RDATA_SEV refers to a severity of data error, which is a response signal Rx that may have a signal width of about 32 bits; (10) RDATA_VALID refers to a read data valid indicator, which is a response signal Rx that may have a signal width of about 8 bits; (11) DRAM_CLK_DIS refers to a DRAM clock disabled, which is a transmit signal Tx that may have a signal width of about 2 bits; (12) CKE refers to a DRAM clock enabled, which is a transmit signal Tx that may have a signal width of about 2 bits; (13) APAR refers to address channel parity, which is a transmit signal Tx that may have a signal width of about 4 bits; (14) ALERT_AERR refers to an address channel parity error, which is a response signal Rx that may have a signal width of about 2 bits; (15) WCK_EN refers to a write clock enabled, which is a transmit signal Tx that may have a signal width of about 8 bits; (16) WCK_TOGGLE refers to a write clock toggle (e.g., a write clock state), which is a transmit signal Tx that may have a signal width of about 16 bits; (17) ALERT_DERR refers to data channel parity error, which is a response signal Rx that may have a signal width of about 4 bits. The total signal width of the transmit signals Tx may be equal to about 664 bits. The total signal width of the response signals Rx may be equal to about 590 bits.

In some embodiments, one or more DFI signals may be excluded based on memory types. For example, in some embodiments, one or more of the following DFI signals may be excluded from being converted and transferred via the die-to-die interface 310: dfi_alert, dfi_disconnect_error, dfi_error_info, dfi_lp_ctrl_*, dfi_lp_data*, dfi_error, dfi_error_info, dfi_ctrlmsg*, dfi_phymstr*, dfi_ctrlupd*, dfi_bank, dfi_bg, and/or the like.

FIG. 4A and FIG. 4B (collectively, FIG. 4) are tables depicting a UCIe flit format for the transmit signal packet 40*tx* for a write operation (e.g., a writing operation), according to some embodiments of the present disclosure.

FIG. 5A and FIG. 5B (collectively, FIG. 5) are tables depicting a UCIe flit format for the response signal packet 50*rx* for a read operation (e.g., a reading operation), according to some embodiments of the present disclosure.

To transmit DFI signals through the UCIe protocol, a UCIe flit format may defined as depicted in FIGS. 4 and 5.

Referring to FIGS. 4A and 4B, a UCIe flit format for the transmit signal packet 40*tx* may include 256 bytes (B) as depicted in the 8 columns (column 0 through column 7) and 32 rows (row 0 through row 31) of FIGS. 4A and 4B. Each column represents 1 B of data. Each field of the table indicating "Type*" may be an input field (e.g., a user input field) corresponding to a beginning of data for a given channel of the three controller-side DFI channels 210*a*, 210*b*, and 210*c*. For example, the controller-side DFI channel 210*a* may be associated with data from row 0 and column 0 through row 10 and column 3. The controller-side DFI channel 210*b* may be associated with data from row 10 and column 4 through row 21 and column 0. The controller-side DFI channel 210*c* may be associated with data from row 21 and column 1 through row 31 and column 7. In some embodiments: col refers to a column address and command field (see FIG. 3); row refers to a row address and command field (see FIG. 3); wrdata refers to data for writing to memory (see FIG. 3); FEC refers to forward error correction code to detect and correct errors (see WRDATA_ECC of FIG. 3); wclk_en refers to a write clock enable (see WCK_EN of FIG. 3); toggle0 refers to a zeroth write clock state (see WCK_TOGGLE of FIG. 3); toggle1 refers to a first write clock state (see WCK_TOGGLE of FIG. 3); *data_en refers to write data enabled (see WRDATA_EN of FIG. 3) or to data read enabled (see RDATA_EN of FIG. 3), which may be encoded depending on whether the associated command is a write command or a read command; RSVD refers to a reserved field; and Timestamp refers to an indication of when the transmit signal packet 40*tx* was last updated.

Referring to FIGS. 5A and 5B, a UCIe flit format for the response signal packet 50*rx* may include 256 B as depicted in the 8 columns (column 0 through column 7) and 32 rows (row 0 through row 31) of FIGS. 5A and 5B. Each column represents 1 B of data. Each field of the table indicating "Timestamp" may corresponding to a beginning of data for a given channel of the three memory-side DFI channels 410*a*, 410*b*, and 410*c*. For example, the memory-side DFI channel 410*a* may be associated with data from row 0 and column 0 through row 9 and column 7. The memory-side DFI channel 410*b* may be associated with data from row 10 and column 0 through row 20 and column 7. The memory-side DFI channel 410*c* may be associated with data from row 21 and column 0 through row 31 and column 7. In some embodiments: Timestamp refers to an indication of when the response signal packet 50*rx* was last updated; valid refers to a read data valid indicator (see RDATA_VALID); RSVD refers to a reserved field; rdata refers to data copied from memory (see RDATA of FIG. 3); FEC refers to forward error correction code to detect and correct errors (see RDATA_ECC of FIG. 3); sev0 refers to a zeroth field indicating a severity of a zeroth data error (see RDATA_SEV); sev1 refers to a first field indicating a severity of a first data error (see RDATA_SEV); aerr[3:0] refers to an address-parity-error field (see ALERT_AERR of FIG. 3); and derr[3:0] refers to a data-channel-parity-error field (see ALERT_DERR of FIG. 3).

Figure 6:
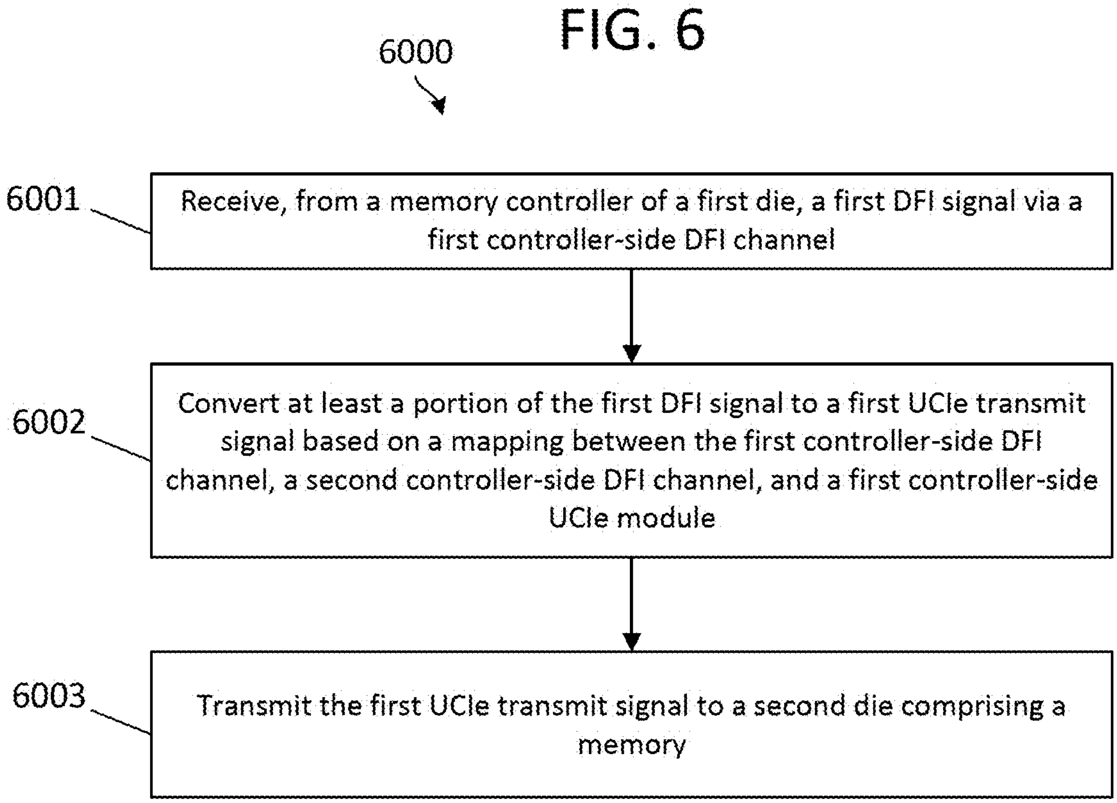
FIG. 6 is a flowchart depicting operations of a method for transmitting and receiving DFI signals using UCIe, according to some embodiments of the present disclosure.

FIG. 6 is a flowchart depicting operations of a method 6000 for transmitting and receiving DFI signals using UCIe, according to some embodiments of the present disclosure.

Referring to FIG. 6, the method 6000 may include one or more of the following example operations. The controller-side UCIe circuit 300 may receive a first DFI signal (e.g., the first controller-side DFI signal 212) via a first controller-side DFI channel (e.g., 210*a*) from the memory controller 200 of the first die 10 (operation 6001). The controller-side UCIe circuit 300 may convert at least a portion of the first DFI signal to a first UCIe transmit signal (e.g., the first UCIe transmit signal packet 40*tx*) based on a mapping (e.g., the controller-side mapping 302) between the first controller-side DFI channel (e.g., 210*a*), a second controller-side DFI channel (e.g., 210*b*), and the controller-side UCIe module 304 (operation 6002). For example, the first controller-side DFI channel (e.g., 210*a*) and the second controller-side DFI channel (e.g., 210*b*) may be mapped to the controller-side UCIe module 304. The controller-side UCIe circuit 300 may transmit the first UCIe transmit signal (e.g., the first UCIe transmit signal packet 40*tx*) to the second die 20 (operation 6003). The second die 20 may include the memory 600.

Accordingly, aspects of some embodiments of the present disclosure may provide improvements to transmitting and receiving DFI signals using UCIe by providing a mapping of DFI channels to UCIe modules using select (e.g., less than all of the) signals of a DFI signal for improved power consumption and improved scalability.

Example embodiments of the disclosure may extend to the following statements, without limitation:

Statement 1. An example method includes: receiving, from a memory controller of a first die, a first DFI signal via a first controller-side DFI channel, the first controller-side DFI channel being one of at least two controller-side DFI channels including the first controller-side DFI channel and a second controller-side DFI channel, converting, by a controller-side UCIe circuit of the first die, at least a portion of the first DFI signal to a first UCIe transmit signal based on a mapping between the first controller-side DFI channel, the second controller-side DFI channel, and a first controller-side UCIe module, the first controller-side UCIe module including a UCIe controller and at least a portion of a UCIe physical layer, and transmitting, by the controller-side UCIe circuit, the first UCIe transmit signal to a second die including a memory.

Statement 2. An example method includes the method of statement 1, wherein the mapping is based on a bandwidth of the first controller-side DFI channel, a bandwidth of the second controller-side DFI channel, and a bandwidth of the first controller-side UCIe module.

Statement 3. An example method includes the method of any of statements 1 and 2, wherein first DFI signal includes a total number of signals that is equal to a first number of signals, and the portion of the first DFI signal includes a total number of signals that is equal to a second number of signals, the second number of signals being less than the first number of signals.

Statement 4. An example method includes the method of statements 3, wherein the second number of signals is based on the first DFI signal including a write command, and the first UCIe transmit signal includes a first flow control unit (flit) format including a first field associated with the first controller-side DFI channel and a second field associated with the second controller-side DFI channel.

Statement 5. An example method includes the method of any of statements 1-5, wherein the at least two controller-side DFI channels further include a third controller-side DFI channel, the first controller-side UCIe module is one of one or more controller-side UCIe modules of the controller-side UCIe circuit, and the mapping is based on providing a ratio of three controller-side DFI channels to a number of controller-side UCIe modules including the first controller-side UCIe module.

Statement 6. An example method includes the method of statement 5, wherein the number of controller-side UCIe modules is one, and the ratio is three to one.

Statement 7. An example method includes the method of statement 5, wherein the number of controller-side UCIe modules is two, and the ratio is three to two.

Statement 8. An example method includes the method of any of statements 1-7, the method further including receiving, from a memory controller of the second die, a second DFI signal via a first memory-side DFI channel, the first memory-side DFI channel being one of at least two memory-side DFI channels including the first memory-side DFI channel and a second memory-side DFI channel, converting, by a memory-side UCIe circuit of the first die, at least a portion of the second DFI signal to a first UCIe response signal based on a mapping between the first memory-side DFI channel, the second memory-side DFI channel, and a first memory-side UCIe module, the first memory-side UCIe module including a UCIe controller and at least a portion of a UCIe physical layer, and transmitting, by the memory-side UCIe circuit, the first UCIe response signal to the first die.

Statement 9. An example method includes the method of statement 8, wherein the second DFI signal includes a total number of signals that is equal to a first number of signals, and the portion of the second DFI signal includes a total number of signals that is equal to a second number of signals, the second number of signals being less than the first number of signals.

Statement 10. An example method includes the method of statement 9, wherein the second number of signals is based on the second DFI signal including a read command, and the first UCIe response signal includes a second flow control unit (flit) format including a first field associated with the first memory-side DFI channel and a second field associated with the second memory-side DFI channel.

Statement 11. An example system for performing the method of any of statements 1-10 includes a system including a host to generate a command, a memory controller to receive the command, a controller-side UCIe circuit communicatively connected to the memory controller via at least two controller-side DFI channels, and a memory communicatively coupled to the memory controller through the controller-side UCIe circuit.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for transmitting and receiving DDR PHY interface (DFI) signals using universal chiplet interconnect express (UCIe), the method comprising:

receiving, from a memory controller of a first die, a first DFI signal via a first controller-side DFI channel, the first controller-side DFI channel being one of at least two controller-side DFI channels comprising the first controller-side DFI channel and a second controller-side DFI channel;

converting, by a controller-side UCIe circuit of the first die, at least a portion of the first DFI signal to a first UCIe transmit signal based on a mapping between the first controller-side DFI channel, the second controller-side DFI channel, and a first controller-side UCIe module, the first controller-side UCIe module comprising a UCIe controller and at least a portion of a UCIe physical layer; and transmitting, by the controller-side UCIe circuit, the first UCIe transmit signal to a second die comprising a memory, the first UCIe transmit signal comprising a first flow control unit (flit) format comprising a first field associated with the first controller-side DFI channel and a second field associated with the second controller-side DFI channel.

2. The method of claim 1, wherein the mapping is based on a bandwidth of the first controller-side DFI channel, a bandwidth of the second controller-side DFI channel, and a bandwidth of the first controller-side UCIe module.

3. The method of claim 1, wherein:

the first DFI signal comprises a total number of signals that is equal to a first number of signals; and the portion of the first DFI signal comprises a total number of signals that is equal to a second number of signals, the second number of signals being less than the first number of signals.

4. The method of claim 3, wherein:

the second number of signals is based on the first DFI signal comprising a write command.

5. The method of claim 1, wherein:

the at least two controller-side DFI channels further comprise a third controller-side DFI channel;

the first controller-side UCIe module is one of one or more controller-side UCIe modules of the controller-side UCIe circuit; and the mapping is based on providing a ratio of three controller-side DFI channels to a number of controller-side UCIe modules including the first controller-side UCIe module.

6. The method of claim 5, wherein the number of controller-side UCIe modules is one, and the ratio is three to one.

7. The method of claim 5, wherein the number of controller-side UCIe modules is two, and the ratio is three to two.

8. The method of claim 1, further comprising:

receiving, from a memory controller of the second die, a second DFI signal via a first memory-side DFI channel, the first memory-side DFI channel being one of at least two memory-side DFI channels comprising the first memory-side DFI channel and a second memory-side DFI channel;

converting, by a memory-side UCIe circuit of the second die, at least a portion of the second DFI signal to a first UCIe response signal based on a mapping between the first memory-side DFI channel, the second memory-side DFI channel, and a first memory-side UCIe module, the first memory-side UCIe module comprising a UCIe controller and at least a portion of a UCIe physical layer; and transmitting, by the memory-side UCIe circuit, the first UCIe response signal to the first die.

9. The method of claim 8, wherein:

the second DFI signal comprises a total number of signals that is equal to a first number of signals; and the portion of the second DFI signal comprises a total number of signals that is equal to a second number of signals, the second number of signals being less than the first number of signals.

10. The method of claim 9, wherein:

the second number of signals is based on the second DFI signal comprising a read command; and the first UCIe response signal comprises a second flow control unit (flit) format comprising a first field associated with the first memory-side DFI channel and a second field associated with the second memory-side DFI channel.

11. A system comprising:

a memory;

a memory controller;

a number of controller-side DFI channels communicatively connected to the memory controller; and a controller-side UCIe circuit comprising a number controller-side UCIe modules communicatively connected to the controller-side DFI channels, the number of controller-side UCIe modules being less than the number of controller-side DFI channels, the controller-side UCIe modules being closer, in a signal path, than the controller-side DFI channels to the memory, wherein:

the controller-side UCIe circuit is configured to convert at least a portion of a first DFI signal to a first UCIe transmit signal based on mapping the controller-side DFI channels to the controller-side UCIe modules; and the first UCIe transmit signal comprises a first flow control unit (flit) format comprising a first field associated with a first controller-side DFI channel of the controller-side DFI channels and a second field associated with a second controller-side DFI channel of the controller-side DFI channels.

12. The system of claim 11, wherein a ratio of the number of controller-side DFI channels to the number of controller-side UCIe modules is equal to three to one.

13. The system of claim 11, wherein a ratio of the number of controller-side DFI channels to the number of controller-side UCIe modules is equal to three to two.

14. The system of claim 11, further comprising:

a number of memory-side DFI channels communicatively connected to the memory; and a number of memory-side UCIe modules communicatively connected to the memory-side DFI channels, the number of memory-side UCIe modules being less than the number of memory-side DFI channels.

15. The system of claim 14, wherein a ratio of the number of memory-side DFI channels to the number of memory-side UCIe modules is equal to three to one.

16. The system of claim 14, wherein a ratio of the number of memory-side DFI channels to the number of memory-side UCIe modules is equal to three to two.

17. The system of claim 11, wherein:

the first DFI signal comprises a total number of signals that is equal to a first number of signals; and the portion of the first DFI signal comprises a total number of signals that is equal to a second number of signals, the second number of signals being less than the first number of signals.

18. The system of claim 17, wherein the second number of signals is based on the first DFI signal comprising a write command.

19. A system comprising:

a host to generate a command;

a memory controller to receive the command;

a controller-side UCIe circuit communicatively connected to the memory controller via at least two controller-side DFI channels; and a memory communicatively coupled to the memory controller through the controller-side UCIe circuit, wherein the command causes the controller-side UCIe circuit to perform:

converting at least a portion of a first DFI signal from the at least two controller-side DFI channels to a first UCIe transmit signal based on a mapping between the at least two DFI channels and a first controller-side UCIe module associated with the controller-side UCIe circuit, the first controller-side UCIe module comprising a UCIe controller and at least a portion of a UCIe physical layer, the first UCIe transmit signal comprises a first flow control unit (flit) format comprising a first field associated with a first controller-side DFI channel of the controller-side DFI channels and a second field associated with a second controller-side DFI channel of the controller-side DFI channels.

* * * * *